United States Patent Office 3,526,651
Patented Sept. 1, 1970

3,526,651
POLYALKYLENEOXIDE - POLYSILOXANE BLOCK COPOLYMERS AND PROCESS FOR PREPARING SAME
Gerd Rossmy, Essen-Werden, Götz Koerner, Mulheim (Ruhr), and Jakob Wassermeyer, Essen-Bredeney, Germany, assignors to Th. Goldschmidt A.-G., Essen, Germany
No Drawing. Filed Feb. 27, 1967, Ser. No. 619,014
Claims priority, application Germany, Mar. 3, 1966, G 46,214
Int. Cl. C07f 7/04, 7/18
U.S. Cl. 260—448.8        14 Claims

ABSTRACT OF THE DISCLOSURE

The invention discloses novel polyalkyleneoxide-polysiloxane block polymers of the general formula

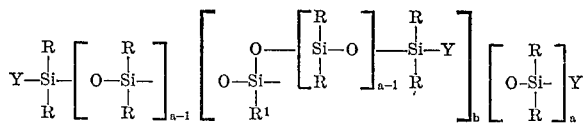

wherein:
R is lower alkyl or phenyl,
R' is lower alkyl, vinyl or phenyl,
$a$ has a value of between 3–10,
$b$ has a value of between 1–14 and
Y represents a mixture composed of about between 60–95 OH-equivalent percents of ($b^1$) polyalkyleneglycolmonoethers, consisting of ethyleneoxide and propyleneoxide units and having a content of 40–70 percent by weight of oxypropylene units and a mole weight of about between 1000 to 3000 and about 5–40 OH-equivalent percents of ($b^2$) monovalent alcohols or phenols.

The novel compounds are superior foam stabilizers in the production of polyurethane foams.

A novel process for preparing the foam stabilizers is also disclosed. According to this process, chloropolysiloxanylsulfates of the average structural formula

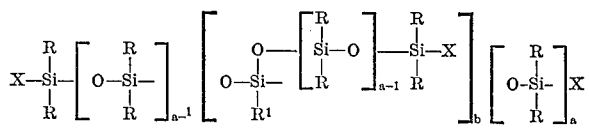

wherein:
R is lower alkyl or phenyl,
$R^1$ is lower alkyl, vinyl or phenyl,
X is chlorine, wherein a portion of the chlorine atoms are replaced by $SO_4/2$,
$a$ has a value of from 3–10 and
$b$ has a value of from 1–14
are reacted with mixtures composed of about between 60–95 OH-equivalent percents of ($b^1$) polyalkyleneglycolmonoethers essentially consisting of ethyleneoxide and propyleneoxide units and having a content of about between 40–70% by weight of oxypropylene units and having a mole weight of 1000–3000 and about 5–40 OH-equivalent percents of ($b^2$) monovalent alcohols or phenols.

The reaction is carried out in quantities so that one acid equivalent of the chloropolysiloxanylsulfate corresponds to at the most 1.4 OH-equivalents.

DESCRIPTION OF THE INVENTION

This invention generally relates to organosilicon compounds and is particularly directed to novel polyalkyleneoxide-polysiloxane block copolymers and to a process for making such polymers.

In the production of polyurethane foams, certain surface active substances are customarily added to the charge or reaction mixture to be foamed. These surface active substances (hereinafter referred to as foam stabilizers) render possible the formation of a uniform pore structure and stabilize the formed foam until the termination of the reaction. Polyalkyleneoxide-polysiloxane block copolymers have been found to be particularly suitable for the indicated purpose.

Various processes have previously been suggested for the prepaartion of such mixed or copolymers of the block type. U.S. Pats. 2,917,480 and 2,834,748 thus disclose processes for the production of block copolymers of the indicated kind. However, only very few of the block copolymers disclosed in these U.S. patents can be successfully employed as foam stabilizers. This is so, because the surface activity of these compounds, although being a necessary criterion, is not sufficient or decisive to render such compounds suitable as foam stabilizers. In order to be capable of effectively fulfilling the requirements for a satisfactory foam stabilizer, the polyalkyleneoxide moiety of the block copolymer has to be present in a predetermined, balanced weight ratio relative to the polysiloxane moiety. Furthermore, the composition of the two blocks or block moieties forming the total block copolymer is of great significance for the foam stabilizing characteristics of the compound.

In respect to the polyalkyleneoxide block, the ratio of ethylene oxide to propylene oxide in the preparation of this block is of particular importance in respect to the foam stabilizing characteristics. On the other hand, in regard to the polysiloxane block, several factors are capable of significantly influencing the characteristics of the entire block copolymer. Thus, for example, the nature of the hydrocarbon groups which are linked to the silicon atom, the average molecular weight of the polysiloxane block, its molecular weight distribution and the extent to which the block is branched, are all factors which influence the final properties of the copolymer.

A further and more recent mode of preparing such polyalkyleneoxide-polysiloxane block mixed or copolymers of different structure has been disclosed in U.S. Pat. 3,115,512. Pursuant to the process as disclosed in U.S. Pats. 2,917,480 and 2,834,748, previously referred to, ethoxysiloxanes are reesterified with polyalkyleneglycols or their monoethers. By contrast, the block copolymers of U.S. Pat. 3,115,512 are prepared by reacting a mixture of di- and trifunctional chlorosilanes with amounts of water and sulfuric acid which are insufficient to accomplish complete hydrolysis, whereafter the chloropolysiloxanylsulfates— which at least approximately are in a state of statistical distribution—are reacted with polyalkyleneglycols or their monoethers.

This esterification reaction proceeds in the presence of an acid acceptor in an irreversible and surprising manner since, according to the state of the art, it should have been expected that the sulfuric acid of the chloropolysiloxanylsulfates would intercept the glycols with resulting esterification.

The process of the present invention is predicated on an extension of the process as disclosed in U.S. Pat. 3,115,512 and is an important modification and improvement thereof. The inventive procedure is based on the surprising realization that reaction products are obtained which have superior and unexpected characteristics as polyurethane foam stabilizers if particular chloropolysiloxanylsulfates on the one hand and certain mixtures of polyalkyleneglycolmonoethers and monovalent alcohols or phenols on the other hand, are carefully selected. The block copolymers obtained in the inventive manner exert their full foam stabilizing activity already at significantly lower concentrations in the charge to be foamed than the known prior art foam stabilizers of the indicated kind. Furthermore, the inventive products, obtained in accordance with the inventive process, are less susceptible and sensitive to unfavorable foaming conditions, so that the foaming can be carried out under less stringently controlled conditions than are usually required in foaming polyurethanes. Employment of the inventive compounds results in the production of foams of extremely fine and uniform cellular structure and the quality of the foam is not affected by widely varying the speed of the agitating means provided in the mixing head. This means that fluctuations in the number of revolutions of the mixer do not affect the cellular structure of the foam to be obtained which, of course, is a great advantage from an operational point of view. Generally, the inventive foam stabilizers are capable of influencing the cell structure of the foam in such a manner that essentially so-called "open cells" are formed if soft foam is to be produced, while so-called "closed cells" are formed in the production of hard or rigid foam.

Accordingly, it is an object of the invention to provide a process for preparing improved polyurethane foam stabilizers of the block copolymer type.

Another object of the invention is to provide novel polyurethane foam stabilizers of the block polymer type which are superior to known stabilizers of this kind.

Generally, it is an object of this invention to improve on the art of foam stabilizers as presently practiced.

Briefly, and in accordance with this invention, the preparation of the inventive block copolymers of the indicated nature is effected by reacting (a) Chloropolysiloxanylsulfates of the average structural Formula I

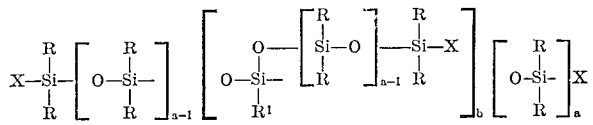

wherein

R is lower alkyl or phenyl,
$R^1$ is lower alkyl, vinyl or phenyl,
X is chlorine, wherein a portion of the chlorine atoms is replaced by $SO_4/2$,
$a$ has a value of between 3 and 10; and
$b$ has a value of between 1 and 14 with (b) mixtures composed of about between 60–95 OH-equivalent percents of ($b^1$) polyalkyleneglycolmonoethers, consisting of ethyleneoxide and propyleneoxide units and having a content of 40–70 percent by weight of oxypropylene units and a mole weight of about between 1000 to 3000, whose hydroxyl group is preferably secondary, and 5–40 OH-equivalent percents of ($b^2$) monovalent alcohols or phenols.

Reactants (a) and (b) are reacted in a manner known per se in quantity relations so that one acid-equivalent of the chloropolysiloxanyl sulfate corresponds to at the most 1.4, but preferably 1.05 to 1.2 OH-equivalents.

As seen from Formula I, the chloropolysiloxanylsulfates are branched. R, as indicated, is generally lower alkyl or phenyl. Methyl, ethyl and propyl are thus suitable lower alkyl groups for the inventive purpose. Within the polymer molecule, the individual R groups may be of different nature. In such event, preferably 90% of all R groups are then methyl groups.

$R^1$ is lower alkyl, such as methyl or ethyl, vinyl or phenyl.

The preferred range for integer $a$ is 3–10. Particularly excellent results are obtained if $a=4–8$. The preferred range for $b$ is 1–8, however, it may generally be between 1–14. The values for $a$ and $b$ are preferably chosen so that the ratio $R/R^1$ is between 10 and 60. The preferred content of silicon in the polymer mixture amounts to 6–10% by weight.

Contingent on the manner of preparation, the chloropolysiloxanylsulfates are, in respect to their polymer distribution, at least approximately in a statistical equilibrium. Such a system is also designated as an equilibrated system. It will be appreciated by those skilled in this specialized art, that block copolymers produced from an equilibrated chloropolysiloxanylsulfate are largely uniform in respect to their characteristics and properties. This of course means that the polymer mixtures formed in accordance with the invention can be prepared in a readily reproducible manner so that the uniformity of the individual batches is excellent.

In a preferred embodiment, 10–30 mole percent of all X groups in the chloropolysiloxanylsulfates constitute $SO_4/2$.

In respect to the polyalkyleneglycolmonoethers which, in accordance with the invention, are reacted with the chloropolysiloxanylsulfates, the hydroxy groups are predominantly present in secondary form. This may, for example, be achieved thereby that in the preparation of the polyalkyleneglycolmonoethers from ethylene oxide and propylene oxide, the reaction is terminated with an addition of propylene oxide.

The polyalkylene glycol monoether of (b) has a molecular weight of between about 1000–3000. The molecular weight is preferably within a range of 1500–1900. The polymer chain is end blocked at one end by an alkyl or aryl group. The alkyl group is preferably a lower alkyl up to 6 carbon atoms. If the end blocking group is aryl, phenyl is the preferred choice. Such polyalkyleneglycolmonoethers may be represented by the general formula $$R^4(OC_2H_4)_m(OC_3H_6)_pOH$$

In this formula, $R^4$ is alkyl or aryl as indicated above.

The values for $p$ and $m$ are determined by two conditions, to wit:

(1) The amount of propyleneoxide units should be 40–75% by weight; and (2) The molecular weight should be between about 1000 and 3000.

Within the molecule, the oxyethylene and oxypropylene units may occur in an alternating sequence or in a sequence which is determined by statistical distribution. However, it is also feasible that a block built up from oxyethylene units may follow a block built from oxypropylene groups.

The other component of (b) is a monovalent alcohol or phenol. In a preferred embodiment, 10–30 OH-equivalent percents of alcohol are employed. Primary or secondary alcohols with up to 4 carbon atoms, particularly isopropanol, are the preferred alcohols. Other alcohols which successfully can be employed in the inventive procedure are lauryl alcohol and its propyleneglycolmonoether.

The novel foam stabilizers obtained pursuant to this invention may be represented by the general Formula II

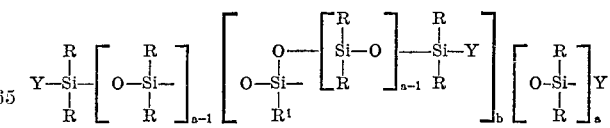

wherein R, R' and $a$ have the same meaning as in Formula I and Y represents a mixture composed of about between 60–95 OH-equivalent percents of ($b^1$) polyalkyleneglycolmonoethers, consisting of ethyleneoxide and propyleneoxide units and having a content of 40–70 percent by weight of oxypropylene units and a mole weight of about between 1000 and 3000, whose hydroxyl group is preferably secondary, and 5–40 OH-equivalent percents of ($b^2$) monovalent alcohols or phenols.

The invention will now be described by examples and comparison tests, it being understood, however, that these examples are given by way of illustration and not by way of limitation and that many changes may be effected without affecting in any way the scope and spirit of this invention as recited in the appended claims.

EXAMPLE I

Preparation of novel foam stabilizer in accordance with the invention 1484 g. (0.825 mole) of a polyalkyleneglycolmonoether were dissolved in 5000 g. of toluene. The molecular weight of the monoether was 1810 and the compound had been obtained by addition of 56.5% by weight of propylene oxide and 43.5% by weight of ethylene oxide to n-butanol. The OH groups of the monoether were predominantly of secondary nature. For azeotropic drying purposes, 1530 g. of the toluene were removed by distillation. The remaining solution was admixed with 15 g. (0.25 mole) of isopropanol. This mixing was effected under stirring and at a temperature of 50° C. Under complete exclusion of water, 539 g. (1 acid equivalent) of a chlorosiloxanylsulfate were added to the mixture. The chlorosiloxanylsulfate had a structural formula corresponding to that of Formula I wherein $R=R^1=CH_3$; $a=6.4$; $b=2$; $x=77.5\%$ chlorine and 22.5% $SO_4/2$. The stirring was continued for 30 minutes at 50° C. and thereafter, and at the same temperature, an amount of $NH_3$ was introduced into the mixture within a time period of 45 minutes so that the reaction mixture turned to the alkaline pH range. The remaining toluene was removed by distillation in vacuum. After the addition of 200 g. of ethanol and 7 g. of ethanolamine, the reaction mixture was stirred at 70° C. for one hour, whereupon the ethanol was removed by distillation at the same temperature and in vacuum. The product was again admixed with 7 g. of ethanolamine. The ammonium salts were permitted to settle at a temperature of 50° C. and were then removed by filtration. The product had a viscosity at 20° C. of 1383 cp.

Preparation of a comparison product according to Example 1a of U.S. Pat. 2,834,748

450 g. (0.3 mole) of a triethoxypolysiloxane of the formula

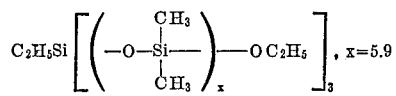

were reacted with 1377 g. (0.9 mole) of a polyalkyleneglycolmonoether of a molecular weight of 1530 in the same manner indicated in said example. The polyalkyleneglycolmonoether had been obtained by the addition of ethyleneoxide (50% by weight) and propyleneoxide (50% by weight) to n-butanol. The OH groups of the monoether were predominantly secondary.

Preparation of polyurethane foams

Foaming charge:
- (A) 400 g. of a polypropyleneoxidetriol (OH number=55); 1.28 g. of tin octoate
- (B) 16 g. of water; 0.4 g. of triethylenediamine; 4.8 g. of silicon modified polyether (foam stabilizer)
- (C) 8 g. of trichlorofluoromethane
- (D) 200 g. of toluylenediisocyanate (2.4:2.6=80:20).

Ingredients (A) and (B) were well mixed together whereupon (C) was added and finally, after the addition of (D), the charge was stirred for 7 seconds at an agitation speed of 3500 r.p.m. The product thus obtained was then poured into a carton having a base surface area of 26 x 26 cm.[2].

Result:

| | Foam stabilizer in accordance with the invention | Foam stabilizer according to U.S. Patent 2,834,748 |
|---|---|---|
| Height | 35 cm | 30 cm. |
| Retraction | 0 cm | 1 cm. |
| Structure | Very fine | Coarse. |
| Porosity | Good and uniform | Fluctuates widely at different levels. |

EXAMPLES 2-9

In an analogous manner as described in Example 1, different chloropolysiloxanylsulfates corresponding to the structural Formula I were reacted and the products obtained were tested as foam stabilizers in compositions of the same kind as referred to in Example 1. The different products and the results obtained are tabulated in the following Tables 1 and 2.

TABLE 1

| Example | Chloropolysiloxanylsulfate | Amount for 1 equivalent acid in the siloxane mole percent | Propyleneoxide content | Ethyleneoxide content | Molecular weight | Alcohol for 1 equivalent acid in the siloxane, mole percent | Viscosity of product at 20° C., cp. |
|---|---|---|---|---|---|---|---|
| 2 | As in Example 1 | 82.5 | 58 | 42 | 1,748 | 25 Isopropanol | 1,245 |
| 3 | do | a 41.25 / b 41.25 | 58 / 55 | 42 / 45 | 1,742 / 1,770 | 25 Methanol | 1,196 |
| 4 | do | a 27.04 / b 55.46 | 40 / 65 | 60 / 35 | 1,743 / 1,650 | 25 Isopropanol | 1,322 |
| 5 | do | a 67.13 / b 15.37 | 58 / 50 | 42 / 50 | 1,767 / 1,782 | do | 1,508 |
| 6 | do | a 72.16 / b 3.12 | 58 / 20 | 42 / 80 | 1,767 / 1,845 | do | 1,402 |
| 7 | do | a 49.5 / b 49.5 | 58 / 55 | 42 / 45 | 1,767 / 1,830 | 10 Isopropanol | 1,258 |
| 8 | Formula I [1] | a 52.25 / b 52.25 | 58 / 55 | 42 / 45 | 1,767 / 1,830 | 5 Isopropanol | 981 |
| 9 | Formula I [2] | a 46.72 / b 46.75 | 58 / 55 | 42 / 45 | 1,767 / 1,830 | 15 Isopropanol | 1,757 |

[1] $R=R^1=CH_3$, $a=6.6$, $b=1$, $x=77.5$ mole percent Cl and 22.5 mole percent $SO_4/2$.
[2] $R=R^1=CH_3$, $a=6.1$, $b=5$, $x=77.5$ mole percent Cl and 22.5 mole percent $SO_4/2$.

TABLE 2.—FOAMING RESULTS

| Example | Foam ht. | Retraction | Structure | Porosity |
|---|---|---|---|---|
| 2 | 32.5 | 1 | Very fine | Very open and uniform. |
| 3 | 32 | 1 | do | Open and uniform. |
| 4 | 32 | 0.5 | Slightly coarse | Reasonably open. |
| 5 | 35 | 1 | Very fine | Open and uniform. |
| 6 | 32 | 1 | do | Do. |
| 7 | 34 | 0.5 | do | Very open and uniform. |
| 8 | 31 | 1 | Fine | Do. |
| 9 | 31 | 1.5 | do | Reasonably open. |

While specific embodiments of the invention have been shown and described in detail to illustrate the application of the inventive principles, it will be understood that the invention may be embodied otherwise without departing from such principles.

What is claimed is:
1. A polyalkyleneoxide-polysiloxane block copolymer of the general formula

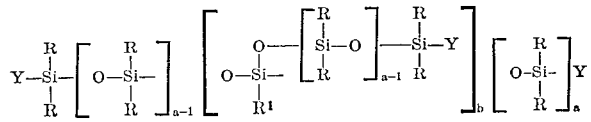

wherein:
R is lower alkyl or phenyl,
$R^1$ is lower alkyl, vinyl or phenyl,
$a$ has a value of between 3–10,
$b$ has a value of between 1–14, and
Y represents a mixture composed of about between 60–95 OH-equivalent percents of ($b^1$) polyalkyleneglycolmonoethers, consisting of ethyleneoxide and propylene-oxide units and having a content of 40–70 percent by weight of oxypropylene units and a mole weight of about between 1000 to 3000 and 5–40 OH-equivalent percents of ($b^2$) monovalent primary or secondary alcohols with up to 4 carbon atoms or phenol.

2. A polyalkyleneoxide-polysiloxane block copolymer as claimed in claim 1, wherein the hydroxyl group of ($b^1$) is a secondary hydroxyl group.

3. A polyalkyleneoxide-polysiloxane block copolymer as claimed in claim 1, wherein R is methyl, ethyl or propyl.

4. A polyalkyleneoxide-polysiloxane block copolymer as claimed in claim 1, wherein at least 90% of all R groups are methyl.

5. A polyalkyleneoxide-polysiloxane block copolymer as claimed in claim 1, wherein $R^1$ is methyl or ethyl.

6. A polyalkyleneoxide-polysiloxane block copolymer as claimed in claim 1, wherein $a=4-8$.

7. A polyalkyleneoxide-polysiloxane block copolymer as claimed in claim 1, wherein $b=1-10$.

8. A polyalkyleneoxide-polysiloxane block copolymer as claimed in claim 1, wherein the ratio $R:R^1$ is about between 10–60, the Si-content of the block polymer being about between 6–10% by weight.

9. A polyalkyleneoxide-polysiloxane block copolymer as claimed in claim 1, wherein the molecular weight of the polyalkyleneglycolmonoethers of ($b^1$) is between about 1500–1900.

10. A polyalkyleneoxide-polysiloxane block copolymer as claimed in claim 1, wherein ($b^2$) contains about between 10–30 OH-equivalent percents of said monovalent primary or secondary alcohols or phenols.

11. A polyalkyleneoxide-polysiloxane block copolymer as claimed in claim 1, wherein the monovalent alcohol is isopropanol.

12. A polyalkyleneoxide-polysiloxane block copolymer as claimed in claim 1, wherein the polymer chain of the polyalkylenemonoethers of ($b^1$) is endblocked at one end by alkyl or aryl.

13. A polyalkyleneoxide-polysiloxane block copolymer as claimed in claim 1, wherein the polyalkylene-monoethers of ($b^1$) are represented by the formula

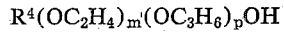

wherein $R^4$ is alkyl or aryl, the values of $p$ and $m$ being determined by the condition that (a) the amount of propylene units is between about 40–70% by weight, and (b) the molecular weight is between about 1000–3000.

14. A polyalkyleneoxide-polysiloxane block copolymer as claimed in claim 1, wherein ($b^2$) is lauryl alcohol or its propyleneglycolmonoether.

References Cited
UNITED STATES PATENTS

| | | | |
|---|---|---|---|
| 2,834,748 | 5/1958 | Bailey et al. | 260—44.8 XR |
| 2,917,480 | 12/1959 | Bailey et al. | 260—448.8 XR |
| 3,109,012 | 10/1963 | Rossmy et al. | 260—448.8 XR |
| 3,115,512 | 12/1963 | Rossmy et al. | 260—448.8 XR |
| 3,170,894 | 2/1965 | Brown et al. | 260—448.8 XR |
| 3,183,254 | 5/1965 | Rossmy et al. | 260—448.8 XR |
| 3,194,773 | 7/1965 | Hostettler | 260—448.8 XR |
| 3,356,758 | 12/1967 | Omietanski et al. | 2,60—448.8 XR |

TOBIAS E. LEVOW, Primary Examiner

P. F. SHAVER, Assistant Examiner

U.S. Cl. X.R.

260—2.5, 46.5, 824